United States Patent [19]

Park

[11] Patent Number: 5,477,271
[45] Date of Patent: Dec. 19, 1995

[54] AUTO-FOCUS REGULATING METHOD FOR VIDEO CAMERAS AND DEVICE THEREOF

[75] Inventor: Hyeong-un Park, Suwon, Rep. of Korea

[73] Assignee: Samsung Electronics Co., Ltd., Kyungki, Rep. of Korea

[21] Appl. No.: 128,787

[22] Filed: Sep. 30, 1993

[30] Foreign Application Priority Data

Mar. 31, 1993 [KR] Rep. of Korea ............... 935195

[51] Int. Cl.$^6$ ................................. H04N 5/232
[52] U.S. Cl. .......................... 348/356; 348/349
[58] Field of Search .................... 348/345, 349, 348/354, 355, 356; 354/400, 402; H04N 5/232

[56] References Cited

U.S. PATENT DOCUMENTS

| | | | |
|---|---|---|---|
| 4,638,364 | 1/1987 | Hiramatsu | 348/354 |
| 4,853,788 | 8/1989 | Murashima et al. | 348/354 |
| 5,003,339 | 3/1991 | Kikuchi et al. | 348/354 |

*Primary Examiner*—Michael T. Razavi
*Assistant Examiner*—Tuan V. Ho
*Attorney, Agent, or Firm*—Lowe, Price, LeBlanc & Becker

[57] ABSTRACT

An auto-focus regulating method for a video camera includes the steps of: obtaining slopes between adjacent pixels contained in a sampling area constituting at least part of a frame screen; integrating all slopes of the sampling area: calculating the difference of the integrated values between the previous and following frame screens; and performing a focus control so that the integrated values in the following frame screens are increased by the difference of the integrated values. The auto-focus regulating method for video cameras has an advantage that various focus modes can be provided compared with the conventional method by which the focus is regulated by the sum of envelopes.

5 Claims, 6 Drawing Sheets

ILLUMINANCE ①  > ② > ③

DEGREE OF OBSCURITY OF THE CONTOUR
① > ② > ③

5,477,271

AUTO-FOCUS REGULATING METHOD FOR VIDEO CAMERAS AND DEVICE THEREOF

BACKGROUND OF THE INVENTION

The present invention relates to an auto-focus regulating method for video cameras and device thereof.

Generally, the auto-focus regulating method for video cameras is classified roughly into an active method by infrared ray distance calculation or ultrasonic wave distance calculation and a passive method by image sensing or image detecting.

According to the active method, infrared rays or ultrasonic waves illuminate an object to be photographed, and the reflected wave is received by a sensor installed in a camera so that the distance between the camera and the object can be measured, thereby driving the focus mechanism of lens so that the focus is regulated in accordance with the measured distance. The active method has advantages in that the focus can be adjusted at a close distance and the performance is high. However, it has a disadvantage in that it requires a separate distance calculator.

The image detecting method of the passive method calculates the distance between two images formed by two fixed reflecting mirrors and an object and drives the focus mechanism.

In contrast, a high frequency detecting method calculates the resolution level of an object by extracting the high frequency component from the image signal and then drives the focus mechanism so that the resolution level of the object becomes maximum. That is, the in-focus state is the state by which the maximum resolution level of an object is achieved. The high frequency detection method uses the maximum high frequency component of the image signal.

Recently, such a high frequency detection method has been widely employed since a separate distance calculator is not needed as in the active method, nor is a mechanical device necessary, unlike the image detecting method.

However, in the image detecting method, it is difficult to regulate the focus normally since, in the case of an object or a background having a low illuminance or an obscure contour, the high frequency component is reduced abruptly.

Also, the image detecting method has been attributed with a disadvantage in that focusing a position on a screen is impossible since the focus should be regulated so that the overall resolution level is improved.

SUMMARY OF THE INVENTION

Therefore, an object of the present invention is to provide an auto-focus regulating method capable of performing a real-time operation by analyzing the frequency spectrum of an image signal.

Another object of the present invention is to provide an auto-focus regulating device satisfying the above object.

An auto-focus regulating method which attains the above first object of the present invention comprises the steps of: obtaining slopes between pixels contained in a sampling area constituting at least part of a frame screen; integrating all slopes of the sampling area; calculating the difference between the integrated values of the previous and following frame screens; and performing a focus control so that the integrated values in the following frame screens are increased according to the difference of the integrated values.

An auto-focus regulating device which attains the other object of the present invention comprises slope detecting means for calculating slopes of adjacent pixels in a sampling area constituting at least part of a frame screen; accumulating means for accumulating the slopes calculated in slope detecting means for the sampling area and outputting the accumulated slopes by a frame period; error detecting means for generating an error value by comparing the output value from the accumulating means by the frame period; and focus driving means for controlling the output value from the accumulating means to be increased according to the output value from error detecting means.

The auto-focus regulating device according to the present invention accumulates the slopes of the image signal detected through the slope detecting means by one frame period, detects the accumulated slope differences between the subsequent frames through the error detecting means, and drives a focus lens so that the detected values from the error detector are increased i.e. increasing the slopes of the image signal of the subsequent frames.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Now, referring to the attached drawings, a description will be given in detail of a preferred embodiment of an auto-focus regulating method for video cameras and device thereof according to the present invention.

Figure 1:
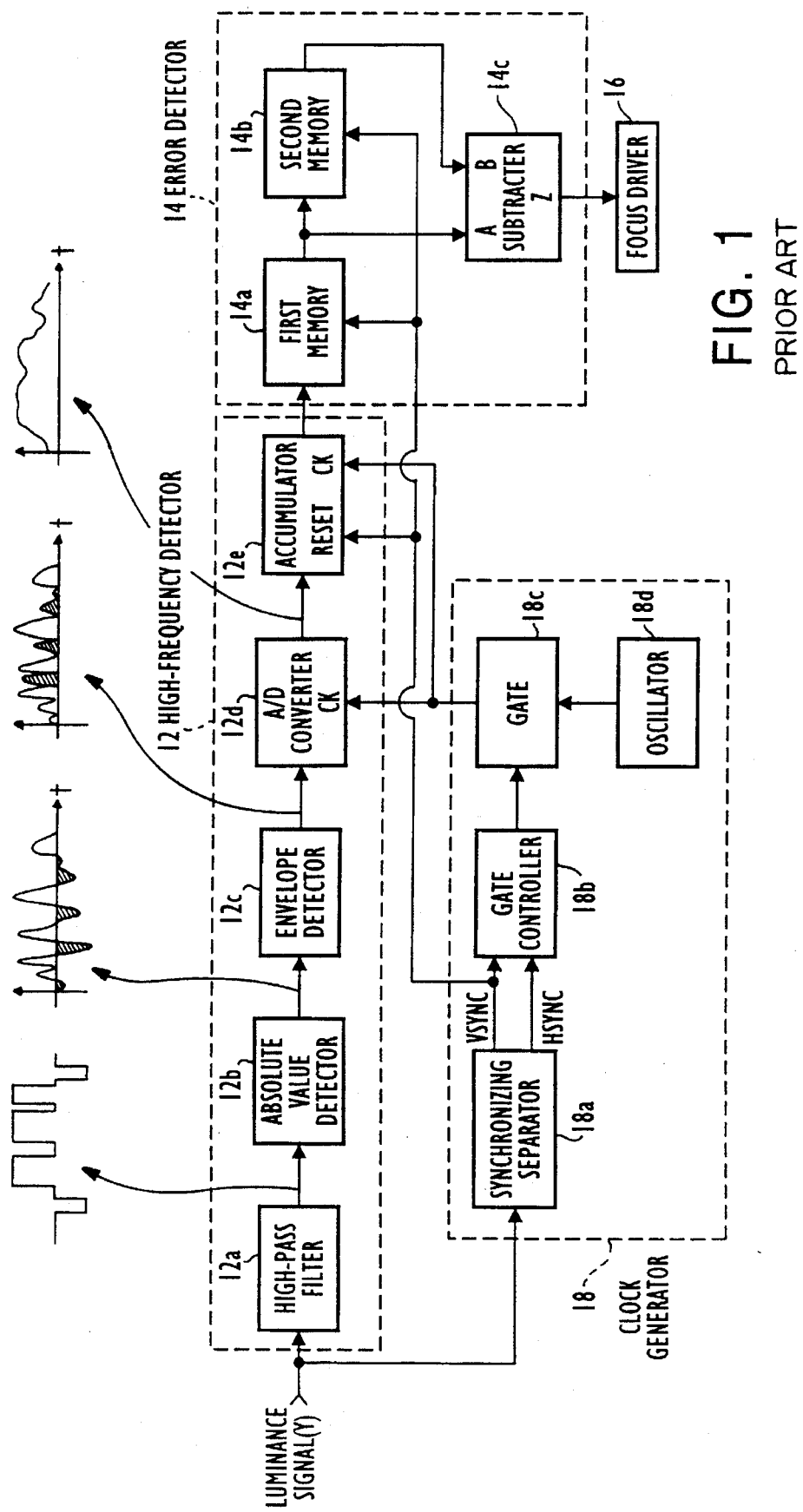
FIG. 1 is a block diagram showing a conventional auto-focus regulating device.

FIG. 1 shows a conventional auto-focus regulating device. in FIG. 1, a reference numeral 12 is a high frequency detector, 14 is an error detector, 16 is a focus driver and 18 is a clock generator.

High frequency detector 12 comprises a high-pass filter 12a, an absolute value detector 12, an envelope detector 12c, analog-to-digital (A/D) converter 12d and an accumulator 12e.

Error detector 14 comprises a first memory 14a, a second memory 14b and a subtracter 14c.

Clock generator 18 comprises a synchronizing separator 18a, a gate controller 18b, a gate 18c and an oscillator 18d.

The operation of FIG. 1 will be described in detail.

The luminance signal Y of the image signal is input to high frequency detector 12 in FIG. 1. High-pass filter 12a passes only the high-frequency component of the luminance signal Y and supplies them to absolute value detector 12b. Absolute value detector 12b receives the high frequency component of luminance signal, and outputs the positive portion of the high frequency component which is more than 0, as it is, but inverts the negative portion of the high frequency component which is less than 0, to produce the positive value and outputs the inverted value. The output of absolute value detector 12b is provided as the input of envelope detector 12c.

Envelope detector 12c detects the envelope of the waveform generated from absolute value detector 12b and delivers it to A/D converter 12d. The sampled value by A/D converter 12d is delivered to accumulator 12e and is accumulated therein for a predetermined period.

The signal generated from accumulator 12e of high frequency detector 12 is offered to error detector 14. Error detector 14 compares the signals delivered from high frequency detector 12 every predetermined period and calculates focus errors. First, the value recorded in second memory 14b is read at the time of applying a vertical synchronizing signal VSYNC to one input terminal of subtracter 14c. Also, the value stored in a first memory 14a is read out at the time of applying a vertical synchronizing signal VSYNC to the other input terminal of subtracter 14c and to second memory 14b at the same time. Subtracter 14c produces the difference of the values applied to both input terminals and outputs the difference value as a focus error to focus driver 16. The signal offered from high frequency detector 12 is recorded in first memory 14a at the rear portion of vertical synchronizing signal VSYNC, and the signal read in first memory 14a is recorded in second memory 14b. The periodical focus error signal is obtained by repeating such operations in a predetermined period.

Focus driver 16 receives the focus error signal and drives a focus ring (not illustrated) of the lens so that the focus error value progressively becomes less and less when following control signals are applied.

Clock generator 18 receives the composite synchronizing signal and generates the signal which controls high frequency detector 12 and error detector 14. Synchronizing separator 18a detects horizontal synchronizing signal HSYNC and vertical synchronizing signal VSYNC from composite synchronizing signal. Vertical synchronizing signal VSYNC is applied as the reset signal of accumulator 12e and the signal for controlling the operation of first and second memories 14a and 14b of error detector 14.

Meanwhile, vertical synchronizing signal VSYNC and horizontal synchronizing signal HSYNC are supplied to gate control circuit 18b and form a control signal delivered to gate control circuit 18c. Gate circuit 18c controls a sampling clock from oscillator 18d to be applied to A/D converter 12d and accumulator 12e.

Figure 2A:
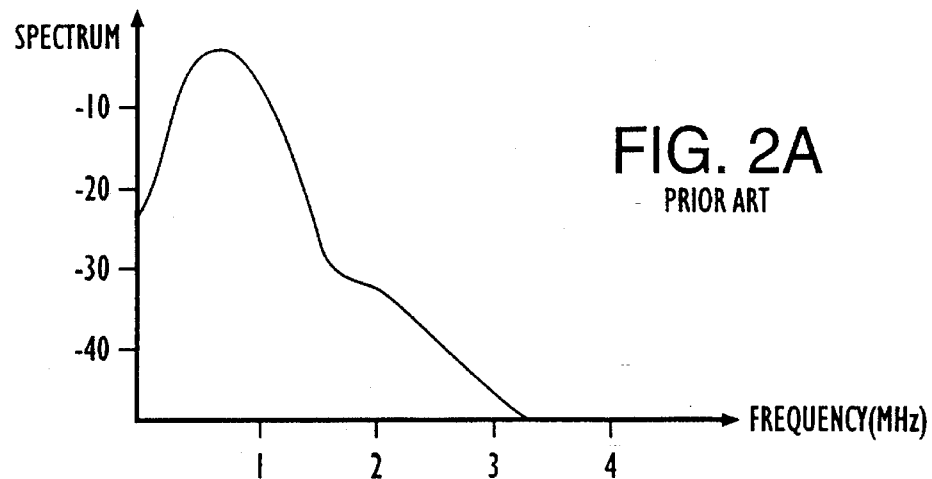
FIGS. 2A through 2C are graphical diagrams showing the operational characteristics of the device shown in FIG. 1.
Figure 2B:
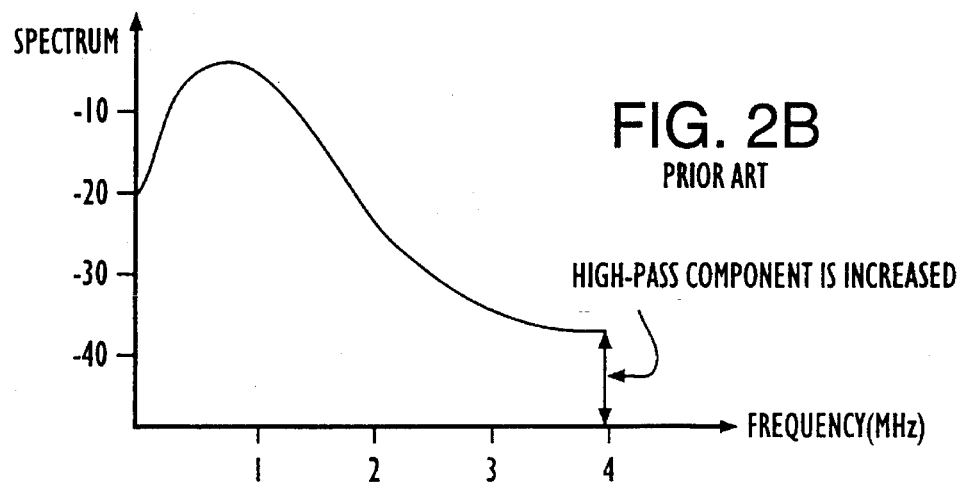
Figure 2C:
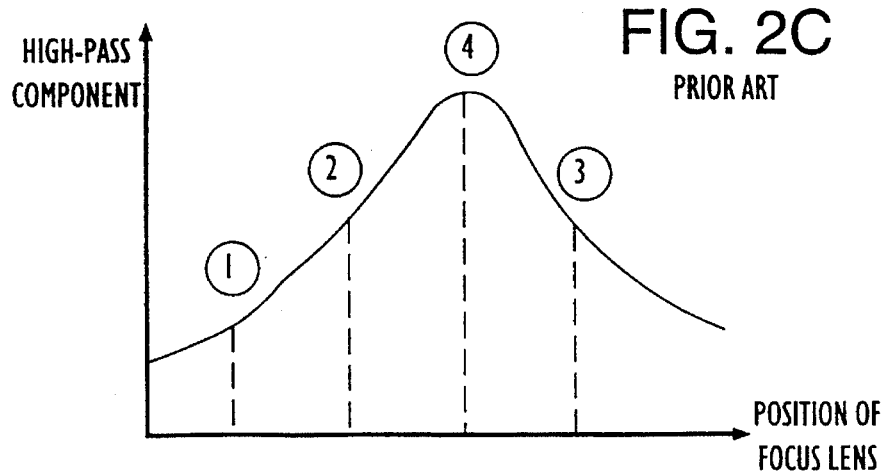

FIGS. 2A through 2C are diagrams showing the operation of the device shown in FIG. 1. FIGS. 2A and 2B are spectrum diagrams of the high-frequency component included in the image signal for the cases of in-focus and out-of-focus, respectively. As shown in FIG. 2B, it is understood that the spectrum of the high-pass component of the image signal is increased in the in-focus state.

FIG. 2C is a diagram showing that the integrated value of the high-frequency component of the image signal for the frame period varies according to the focus lens positions. In FIG. 2C, the optimal focus is achieved at position 4 among positions 1, 2, 3 and 4. The auto-focus regulating device in FIG. 1 calculates the focus errors every frame period and controls the focus lens to be positioned at position 4 at which the high frequency component of the image signal is maximum.

The auto-focus regulating device shown in FIG. 1 is based on the principle that the high-band component of the luminance signal increases according as the image of an object to be photographed becomes clearer. Therefore, when the high-band component of the luminance signal is lowered to a level equal to or less than a predetermined level due to the low luminance, the change of surroundings, etc., it is difficult to adjust the focus properly.

Figure 3A:
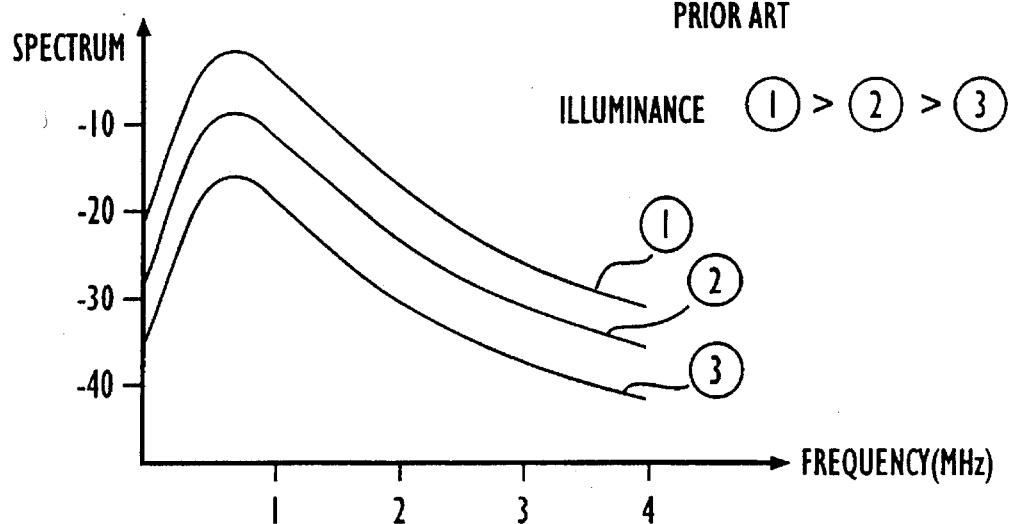
FIGS. 3A and 3B are graphical diagrams showing the characteristics of the frequency spectrum of an image signal depending on the variations of illuminance and surroundings.

FIG. 3A shows the change of the frequency spectrum according to the change of the illuminance. It can be seen that the high-frequency component of the frequency spectrum is lowered at positions 2 and 3 at which the illuminance is low, compared to position 1 at which the illuminance is higher.

Figure 3B:
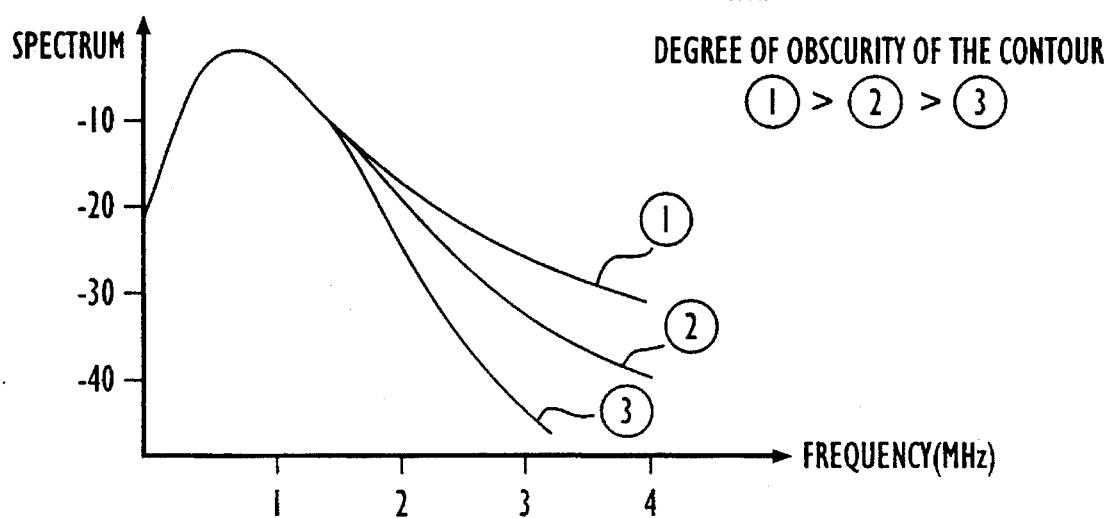

FIG. 3B shows the change of the frequency spectrum according to the change of surroundings. It can be seen that the more obscure the contour of an object and background to be photographed becomes, the lower the high-frequency component of the frequency spectrum becomes.

When the high-frequency component of the image signal is reduced to the critical point of the auto-focus regulating device in FIG. 1, or below, according to the change of the illuminance and surroundings as in FIGS. 3A and 3B, the regulation of the focus becomes impossible.

It may be considered, as a way to solve such a problem, to exactly analyze high-frequency spectra of the entire frequency band of the image signal. However, to perform the above analysis, a time-frequency conversion device such as a Fourier converter is necessary. Also, real-time processing causes a considerable increase in cost.

The auto-focus regulating method according to the present invention in order to rectify the above disadvantage, employs a phenomenon wherein, as the clearer the image of an object to be photographed becomes more clear, the contour also becomes more clear, that is, the slope of the image signal is increased. The process thereof is as follows:

(1) The slope between pixels which are included in a sampling area constituting at least part of a frame screen and which are positioned adjacently to each other, is obtained. Here, the sampling area is the area considered at the time of focus regulation and may be an object or a background to be photographed. It is desirable to use the slope of the high-pass-filtered luminance signal as the respective slopes at the positions of the pixels.

Assuming that a value of the high-pass-filtered luminance signal is f(x,y) at the adjacent pixel position (x,y), slope T is obtained by a first derivative of f(x,y).

That is, $$T = f'(x,y)$$

The slope (T) has a characteristic showing the maximum value in case the focus in the sampling area is fixed exactly.

(2) All slopes in the sampling area are integrated.

$$A(x,y) = \iint T \cdot W(x,y) dx dy = \iint f'(x,y) \cdot W(x,y) dx dy$$

Here, W(x,y) is a constant and indicates the weight value (degree of importance) of the respective elements constituting the sampling area.

In the auto-focus regulating method according to the present invention, the sampling area is divided into a plurality of sub-areas and the weight values in the respective sub-areas are set randomly. Then, various focus modes such as emphasis, enfeeblement and elimination with respect to the portions of the screen, are determined.

(3) The difference of the integrated values between the preceding and following frame screens is calculated. Generally, the integrated values in the sampling area are compared by one frame period (63.5 μs in the case of the NTSC method). The focus lens is controllable using the principle that the integrated value difference of the preceding and following frame periods is proportionate to an amount of focus deviation based on the position of the corresponding focus lens.

(4) The focus control is performed so that the integrated value of the following frame screen is increased according to the integrated value difference. By such an operation, the position of focus lens is changed in the direction in which the integrated value of the following period becomes larger than that of the preceding period, and then the focus is fixed exactly.

Figure 4:
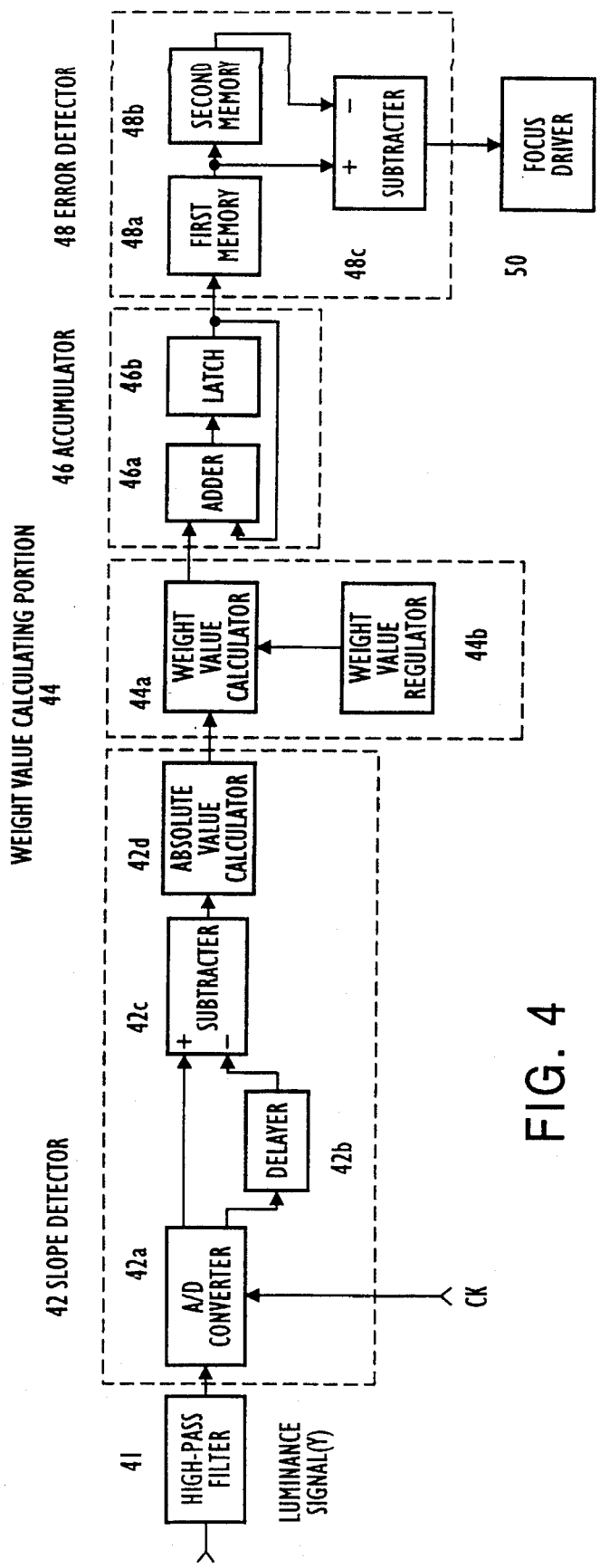
FIG. 4 is a block diagram showing an auto-focus regulating device according to a preferred embodiment of the present invention.

FIG. 4 is a block diagram showing the auto-focus regulating device according to the present invention. In FIG. 4, a reference numeral 41 is a high-pass filter, 42 is a slope detector, 44 is a weight value calculator, 46 is an accumulator, 48 is an error detector and 50 is a focus driver.

Slope detector 42 comprises an A/D converter 42a, a delayer 42b, a subtracter 42c and an absolute value calculator 42d.

Weight value calculating portion 44 comprises a weight value calculator 44a and a weight value regulator 44b.

Accumulator 46 comprises an adder 46a and a latch 46b.

Error detector 48 comprises a first memory 48a, a second memory 48b and a subtracter 48c.

The operation of the auto-focus regulating device of FIG. 4 is described in detail. The operation of the various kinds of the clocks is referenced from the description of FIG. 1 and the detailed description thereof is omitted here.

High-pass filter 41 receives the luminance signal and high-pass-filters the received luminance signal. Then, the result is supplied to slope detector 42. Slope detector 42 receives the high-pass-filtered luminance signal, calculates the slope between the adjacent pixels in the sampling area and supplies the calculated slope to weight value calculating portion 44. A/D converter 42a of slope detector 42 performs the sampling of the high-pass-filtered luminance signal and supplies the sampled signal to delayer 42b and subtracter 42c. Delayer 42b delays the sampling data generated from A/D converter 42a for one sampling period. Subtracter 42c produces a difference value between the sampling data (Pi) of A/D convertor 42a and the sampling data (Pi-1) of delayer 42b delayed by a sampling period, and supplies the difference value to absolute value calculator 42d. Absolute value calculator 42d outputs input data having a positive value directly, but inverts input data having a negative value and outputs the inverted value.

Weight value calculating portions 44 multiplies the weight value which is set in the sampling area by the slope and outputs the multiplied value. Weight value calculator 44a of weight value calculating portion 44 multiplies the slope of which the absolute value is calculated by the corresponding weight value and delivers the result to accumulator 46. Weight value regulator 44b regulates the weight values for the sub-areas in the sampling area.

Figure 5B:
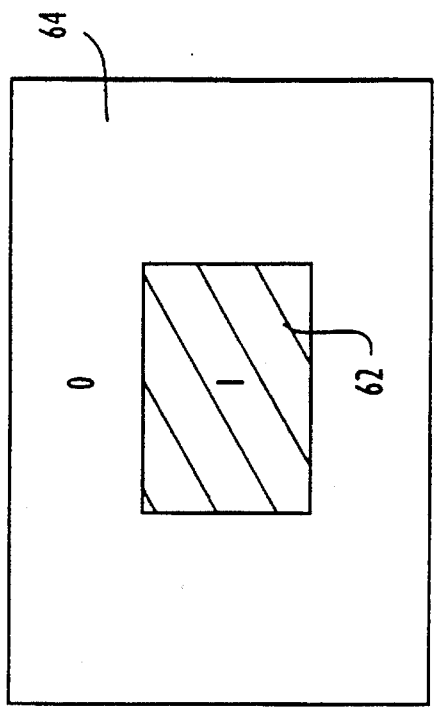
FIGS. 5A and 5B show divided sub-areas and weight values assigned to the respective sub-areas in the operation of the device illustrated in FIG. 4.
Figure 5A:
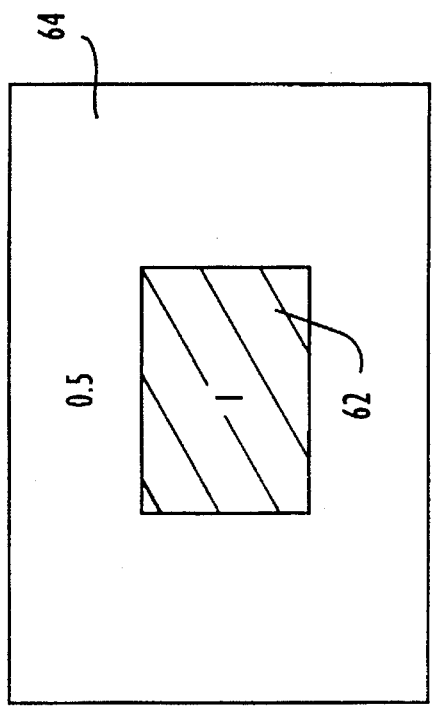

FIGS. 5A and 5B are diagrams showing the weight value allotment state in the sub-area in the sampling area. The sampling areas shown in FIGS. 5A and 5B correspond to the frame areas and the sub-areas correspond to central area 62 and surrounding area 64.

In FIG. 5A, since a weight value of "1" is allotted to central area 62 and "0.5" is allotted to surrounding area 64, the focus is regulated such that central area 62 thereof is emphasized. In FIG. 5B, the focus is regulated such that surrounding area 64 is eliminated, namely, the central area 62 is concentrated, since the weight value of "1" is allotted to central area 62 and "0" is allotted to surrounding area 64.

Figure 6:
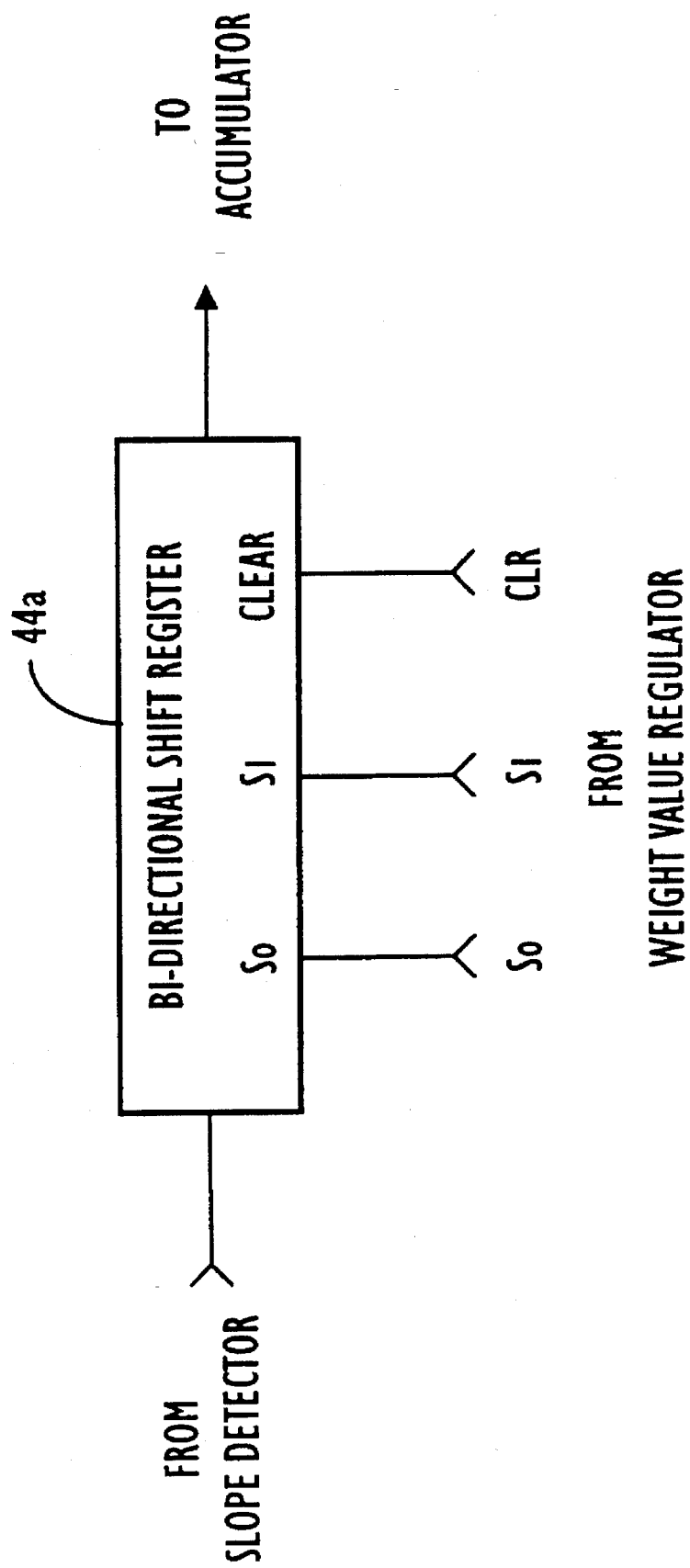
FIG. 6 shows a preferred embodiment of the weight value operator illustrated in FIG. 4.

FIG. 6 is a diagram showing an embodiment of a weight value calculator 44a of FIG. 4. A bi-directional shift register is shown in FIG. 6 and the left and right shift operations are controlled by control signals S0 and S1 which are input to the shift register.

The bi-directional shift register is controlled as shown in Table 1, that is, assuming that a high clear signal CLR is input from weight value regulator 44b, in case S0 is 1, a left-shift operation is performed in case S1 is 1, a right-shift operation is performed.

TABLE 1

| CLR | S0 | S1 | Control operation |
|-----|----|----|-------------------|
| 0   | X  | X  | Clear             |
|     | X  | X  | Clear             |
| 1   | 0  | 1  | Shift right       |
|     | 1  | 0  | Shift left        |

Table 2 shows the change of weight values corresponding to control signals.

TABLE 2

| Input  | D7 | D6 | D5 | D4 | D3 | D2 | D1 | D0 | Control signal | Weight Value |
|--------|----|----|----|----|----|----|----|----|----------------|--------------|
| Output | D6 | D5 | D4 | D3 | D2 | D1 | D0 | 0  | SHIFT LEFT     | 2            |
|        | D7 | D6 | D5 | D4 | D3 | D2 | D1 | D0 | NO SHIFT       | 1            |
|        | 0  | D7 | D6 | D5 | D4 | D3 | D2 | D1 | SHIFT RIGHT    | 1/2          |
|        | 0  | 0  | 0  | 0  | 0  | 0  | 0  | 0  | CLEAR          | 0            |

Accumulator 46 accumulates the values generated from weight value calculator 44a with respect to the sampling area and supplies the accumulated value to error detector 48.

Error detector 48 compares the signal offered from accumulator 46 every predetermined period and then calculates focus error values. First, the value recorded in second memory 48b is read at the time of applying vertical synchronizing signal VSYNC to one input terminal of subtracter 48c. Also, the value stored in first memory 48a is read at the time of applying vertical synchronizing signal VSYNC to the other input terminal of subtracter 48c and second memory 48b at the same time. Subtracter 48c produces the difference of the values applied to both input terminals and outputs the difference value to focus driver 50 as a focus error value. The signal offered by accumulator 46 in the rear portion of vertical synchronizing signal VSYNC is recorded in first memory 48a and the signal read in first memory 48a is recorded in second memory 48b. By repeating such operations every predetermined period, the periodical focus error signals are obtained. Focus error signals are supplied to focus driver 50 as signals which drive the focus lens (not illustrated).

As described above, the auto-focus regulating method according to the present invention has an advantage in that various focus modes can be provided in comparison with conventional method wherein the focus is regulated by the sum of envelopes.

Also, since the auto-focus regulating device according to the present invention is structured digitally, the manufacture of the device as art integrated circuit is easy. Furthermore, the focus modes can be controlled via software, so that various consumers' needs can be accommodated.

What is claimed is:

1. In a device for controlling a focus for video cameras automatically, an auto-focus regulating device for video cameras comprising:

slope detecting means for calculating slopes of an input luminance signal in a sampling area constituting at least a part of a frame screen;

accumulating means for accumulating the slopes calculated in said slope detecting means and outputting the accumulated slopes by a frame period;

error detecting means for generating an error value by comparing the output value from said accumulating means by the frame period; and focus driving means for adjusting the focus to control the output value from said accumulating means to be increased based on the error value from said error detecting means;

wherein said slope detecting means comprises:

a delayer for delaying the input luminance signal by a predetermined period;

a subtracter for calculating a difference between the input luminance signal and output from said delayer; and an absolute value calculator for converting output from said subtracter into an absolute value and supplying the result to said accumulating means.

2. The auto-focus regulating device for video cameras as claimed in claim 1, further comprising a high-pass filter for high-pass filtering the input luminance signal and supplying the result to said slope detecting means.

3. The auto-focus regulating device for video cameras as claimed in claim 1, further comprising weight value calculating means for multiplying the slope produced by said slope detecting means by a predetermined weight value and supplying said calculated output to said accumulating means.

4. The auto-focus regulating device for video cameras as claimed in claim 3, wherein said weight value calculating means comprises:

a weight value calculator for executing the multiplication of said slope produced by said slope detecting means by the predetermined weight value and supplying the result to said accumulator means; and a weight value regulator for storing the predetermined weight value allotted to the sampling area, reading out the stored weight value, and supplying same to said weight value calculator.

5. The auto-focus regulating device for video cameras as claimed in claim 4, wherein said weight value calculator is a bi-directional shift register.

* * * * *